Sept. 16, 1958 G. F. STETZLER 2,852,703

PULSE GENERATOR SYSTEMS

Filed July 9, 1957 2 Sheets-Sheet 1

INVENTOR
G. F. STETZLER
By W. C. Parnell
ATTORNEY

Sept. 16, 1958 G. F. STETZLER 2,852,703

PULSE GENERATOR SYSTEMS

Filed July 9, 1957 2 Sheets-Sheet 2

INVENTOR
G.F. STETZLER
By W. C. Parnell
ATTORNEY 2,852,703

PULSE GENERATOR SYSTEMS

Grant F. Stetzler, Temple, Pa., assignor to Western Electric Company, Incorporated, New York, N. Y., a corporation of New York Application July 9, 1957, Serial No. 670,699

9 Claims. (Cl. 307—132)

This invention relates to pulse generator systems and particularly to inexpensive systems utilizing relays for producing periodic current flow in an external circuit.

Most commercially available pulse generators include complex electronic circuitry for controlling the magnitude, duration, and frequency of the output pulses to exacting requirements and therefore are costly. There is a need in the art for simple, inexpensive generators for supplying recurrent pulses where the pulse duration and time interval between the individual pulses need not be controlled to such exacting requirements. For example, such a generator may be used in testing the switching characteristics of transistors used for electronic switching purposes. In determining the "rise time" of a transistor, recurrent pulses of positive polarity are applied to a non-conducting transistor and the time required for the transistor to start conducting is observed on a calibrated oscilloscope which displays the output of the transistor as well as the input pulses thereto. Conversely in determining the "cut-off time," recurrent negative polarity pulses are applied to a conducting transistor and the time required for it to stop conducting is observed on an oscilloscope. For these tests, it is necessary that the pulse rate be sufficiently high to permit using a fairly high sweep rate to provide sufficient trace intensity on the oscilloscope (i. e., 240 to 960 pulses per second). The time duration of the pulses need not be accurately controlled; the duration of the individual pulses should, however, be longer than the transition periods between the non-conducting and conducting (or vice versa) conditions of the transistor under test, which may be in the order of twenty micro-seconds.

Heretofore relays have been used for pulsing and circuit interrupting purposes with the circuit to be interrupted or pulsed connected in series with the relay armature and one of the contacts. With this arrangement the circuit is closed whenever the relay is operated and opened whenever the relay is released, or vice versa. The main drawback with such systems is the relatively low pulsing or interrupting rates permissible with the available relays, the maximum being 120 pulses per second with conventional relays energized from a sixty cycle per second source.

An object of this invention is a relay pulsing system having a high pulse rate.

Another object is a system for producing momentary current in an external circuit at a high repetitive rate.

Still another object is to cyclically operate a relay to render an external circuit conductive for relatively short periods at a repetitive rate substantially greater than the permissible operating rate of the relay.

According to the general features of the invention, a mercury contact switching device is cyclically operated and a load or circuit to be pulsed is connected across the contacts between which the armature travels. Due to the mercury thereon, the contacts are bridged momentarily each time the armature transfers, thereby impressing on the load two short pulses each operating cycle.

In a preferred embodiment of the invention where a high pulsing rate is required, the contacts of a plurality of mercury contact relays are connected in parallel to the load and the relays are successively energized from an alternating potential source through phase shifting devices which stagger the pulses in a desired time distribution.

These and other features of the invention will be more fully understood from the following detailed description taken in conjunction with the accompanying drawing, in which.

Figures 1, 2, 3:
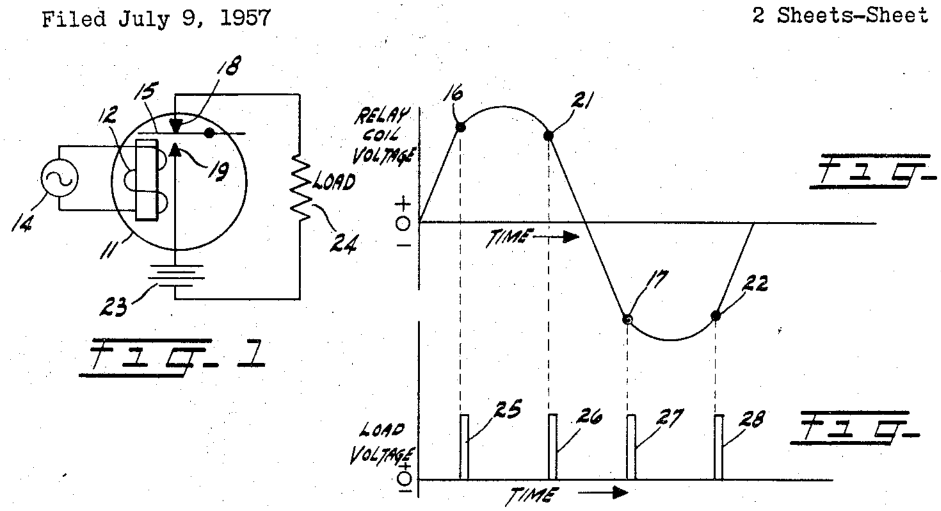
Fig. 1 is a schematic diagram of a basic pulsing circuit according to the invention.
Figs. 2 and 3 are diagrammatic representations of coil voltage and load voltages, respectively, versus time for the circuit of Fig. 1.

The basic circuit shown in Fig. 1 utilizes a conventional mercury relay 11 with a solenoidal or operating coil 12 energized by a supply of alternating potential 14 so that the instantaneous potential across the coil follows the sine curve shown in Fig. 2. The relay armature 15 is of soft iron and unmagnetized such that whenever a potential difference across the coil 12 is of a prescribed magnitude of either positive or negative polarity, as designated by points 16 and 17 on the curve, the relay operates and the armature 15 transfers from a first contact 18 to a second, spaced-apart contact 19. The relay releases, that is, the armature returns to the contact 19 when the magnitude of the voltage across the coil is reduced below the operating values, the release values are designated 21 and 22 on the curve. In conventional mercury contact relays the armature and contacts are continuously covered with mercury and are usually enclosed in a glass tube in an inert atmosphere being supplied with mercury through capillary action from a mercury pool or reservoir. A phenomenon of conventional mercury contact relays is that at all practical operating rates, which usually run up to 120 operations per second, there will be a short period (for example, between 100 to 1,000 micro-seconds) during the transfer of the armature in either direction when both contacts and the armature will be electrically connected together by mercury bridging across the contacts. Whenever this bridging occurs in the circuit in Fig. 1, the source 23 in the external load circuit is momentarily connected through the mercury-bridged contacts 18 and 19 across the load 24. Then whenever the armature transfers from one contact to the other in either operating or releasing at points 16, 21, 17 and 22 on the curve, the load circuit will be momentarily energized or rendered conductive as indicated by the conductive periods of pulses 25, 26, 27 and 28 of Fig. 3. For each complete alternating cycle of the source 14, four pulses or load circuit conducting periods are obtained. If the operating frequency of the source 14 is 60 cycles per second, then this circuit would produce 240 pulses per second in the load circuit.

Figure 4:
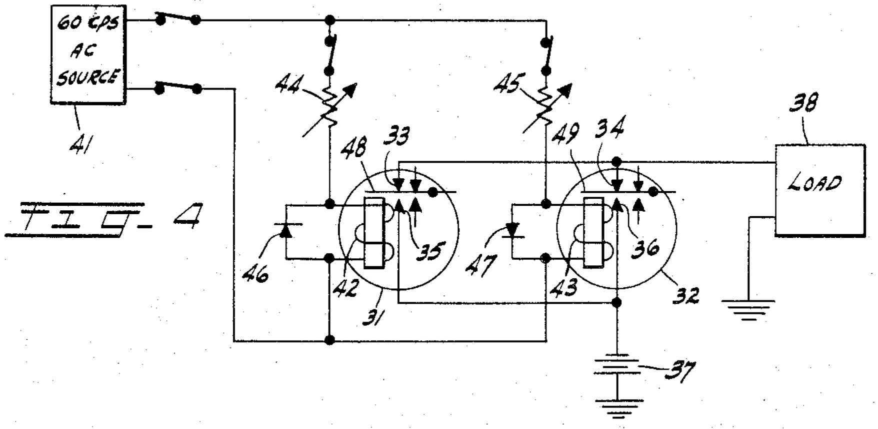
Fig. 4 is a system for generating 240 pulses per second utilizing two mercury contact relays.
Figures 5, 6:
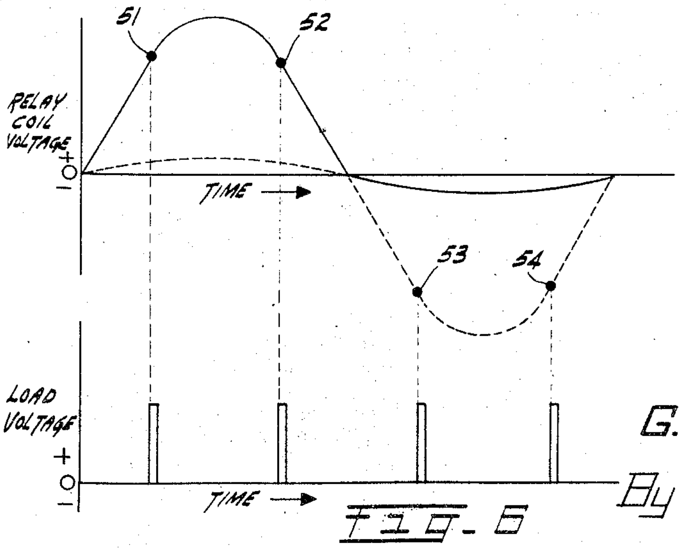
Figs. 5 and 6 are diagrammatic representations of coil voltage and load voltages, respectively, versus time of the circuit of Fig. 4.

For applications requiring continuous operation or relatively long duty time, it has been found that the life of conventional type mercury contact relays can be extended substantially by reducing their frequency of operation below 120 operations per second. The system of Fig. 4 is designed for producing 240 pulses per second utilizing a 60 cycle per second relay energization and operating the relays just once each cycle. This circuit includes two conventional mercury contact relays 31 and 32 such as the Western Electric Company type 275B manufactured by the Western Electric Company, Incorporated of New York, New York. Corresponding contacts 33 and 34 and the contacts 35 and 36 of relays 31 and 32 are connected in parallel with the parallel arrangement connected in series with a direct current supply 37 and a load 38. A sixty cycle per second supply 41 applies operating potential to the relay operating coils 42 and 43 through the resistance elements 44 and 45, respectively. Rectifier elements 46 and 47 are connected in opposite senses across the coils 42 and 43, respectively, so that the coils will be alternately short-circuited during opposite half-cycles of the energizing potential. Thus, as seen in Fig. 5, the operating potential for the relay coil 42 is shown in solid line and the operating potential for coil 43 is shown in dashed line.

The armature 48 of relay 37 is operated only once during the first positive half-cycle, that is, when the potential reaches the magnitude designated 51 on the curve, and it is released when the potential falls slightly below the operate magnitude, as indicated by numeral 52 on the curve. The relay 31 is not operated during the negative half-cycle of the applied voltage due to the short circuiting effect of the rectifier 46. Similarly, the armature 49 of relay 32 is not actuated during the positive half-cycle, when diode 47 short-circuits the coil 43, but is operated when the potential swings negative and reaches the magnitude indicated by numeral 53 and is released when the absolute magnitude of the negative potential falls slightly below this operate value at the point designated numeral 54 on the curve. When the contacts of either relay 31 or 32 are bridged across the load circuit is closed and pulses will be produced in the load circuit at the times corresponding to the voltages 51, 52, 53 and 54, as illustrated by the pulses in the curve of Fig. 6. Thus, the pulse rate is 240 pulses per second or four times the frequency of the source 41.

Figure 7:
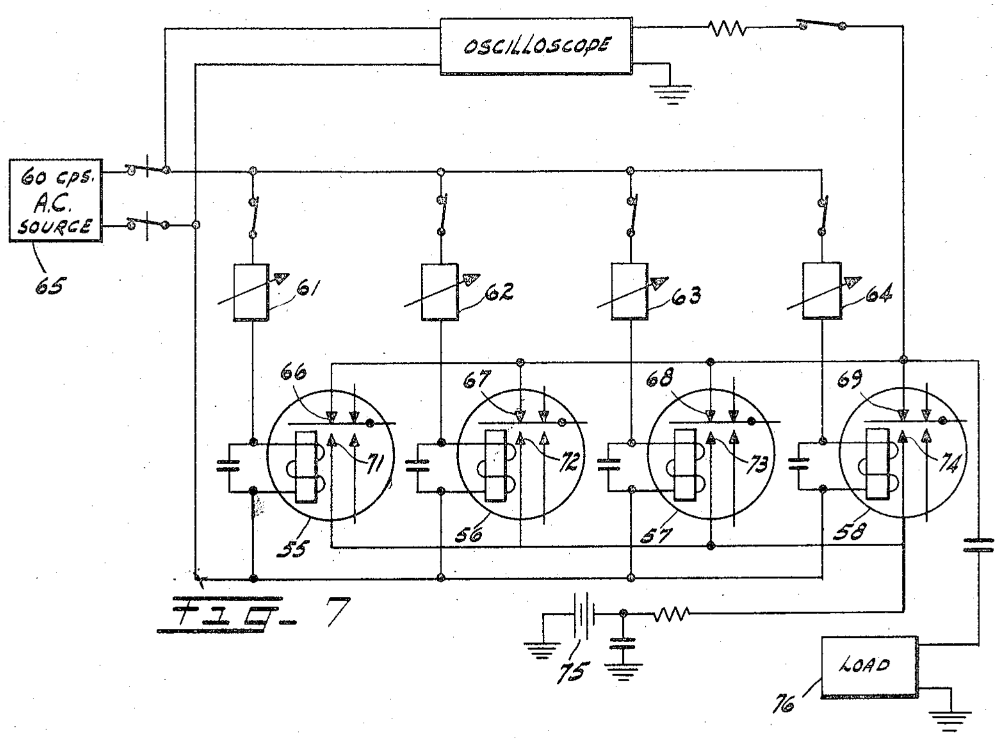
Fig. 7 is a system for generating 960 pulses per second utilizing four mercury contact relays.
Figures 8, 9:
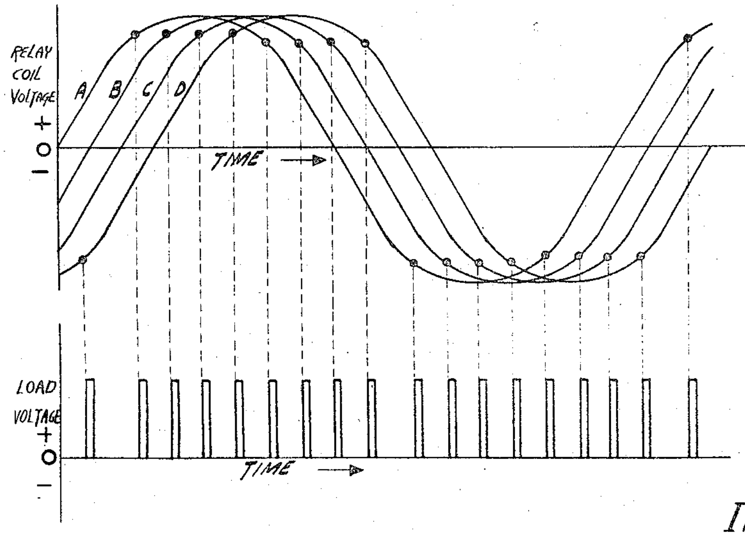
Figs. 8 and 9 are diagrammatic representations of coil voltages and load voltages, respectively, versus time for the circuit of Fig. 7.

Another embodiment of the invention for producing 960 pulses per second in a load circuit is shown in Fig. 7. In this system, a plurality of relays 55, 56, 57 and 58 are utilized, the operation being staggered to produce a desired time distribution between pulses. In this circuit the coils of the four mercury contact relays are energized through phase shifting networks 61, 62, 63 and 64 by the common sixty cycle per second supply 65. As in the circuit of Fig. 4, corresponding contacts 66, 67, 68 and 69 and 71, 72, 73 and 74 are connected in parallel and the parallel arrangement connected in series with a direct current source 75 and a load 76. The phase shifters 61, 62, 63 and 64 are adjusted to stagger the coil voltages of relays 55, 56, 57 and 58 illustrated by the voltage curves A, B, C and D in Fig. 8, respectively, to produce the corresponding staggered relation pulsing sequence in the load circuit, as seen in Fig. 9. Since each relay is operated during both the positive and negative half-cycles, similar to that of the relay 11 of Fig. 1, each relay will deliver four pulses to the load or a total of 960 pulses per second. The sequence, as seen in Fig. 9, may be obtained by utilizing an oscilloscope connected in the output or load circuit while the adjustments are being made in the various phase shifter circuits. While only three phase shifters 62, 63 and 64 are needed to produce the desired phase separation between voltage curves, the fourth shifter 61 simplifies the adjusting operation. Due to slight differences in operating characteristics between relays, the short contact bridging intervals may vary somewhat, for example, these intervals may range between 250 to 350 micro-seconds for a particular type of relay. Further, due to a slight difference in the operating and releasing potential values for the relays, the spacing between successive pulses may not be identical. In any event, the pulse pattern established over a complete cycle of the coil energizing source is substantially constant.

In addition to the above described embodiments, it is, of course, apparent that different numbers of relays could be used in the system of Fig. 7 for producing different pulsing rates. Also, for heavy-duty or continuous operation, rectifier elements may be connected across the relay coils in a system of the type disclosed in Fig. 7 for the advantages described in connection with Fig. 4. In this case twice as many relays would be needed, as each would be conductive for one half-cycle only.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a system for closing an external circuit at a prescribed repetitive rate, a switching device having contacts, an armature movable between the contacts and mercury on the contacts for momentarily bridging the contacts each time the armature is transferred from one contact to the other, means connecting the contacts in the external circuit for closing the circuit each time the contacts are bridged, and means for successively actuating the armature at a frequency equal to one-half the prescribed repetitive rate.

2. In a system for closing an external circuit at a predetermined repetitive rate, a relay having an operating coil, two spaced contacts, an armature movable between the contacts, and mercury on the contacts for momentarily bridging across the contacts each time the armature is transferred from one contact to the other, means for energizing the coil at regularly timed intervals to actuate the armature, and means connecting the contacts in the external circuit for closing the circuit each time the contacts are bridged.

3. A pulse generator comprising a relay having an operating coil, two contacts, an armature movable between the contacts, and mercury on the contacts for momentarily bridging across the contacts each time the armature is transferred from one contact to the other, means for energizing the coil at regularly timed intervals to actuate the armature, and an output circuit including a source of potential, connected in series with the contacts and a load, for supplying a pulse of energy from the source to the load each time the armature is moved from one contact to the other.

4. A pulse generator comprising a relay having a pair of mercury-wetted contacts, an armature, means normally holding the armature against one of the contacts, an operating coil for transferring the armature from said one contact to the other each time a potential of prescribed magnitude, of either polarity, is applied thereto, the spacing of the contacts being such that the mercury on the contacts bridges the contacts momentarily, once when the armature is transferred from said one contact to the other, and a second time when the armature is released and returned to said one contact, a load circuit including a source of potential, connected in series with the contacts, and an alternating potential source connected to the coil for actuating the armature twice during each cycle for producing four momentarily conductive periods in the load circuit.

5. A pulse generator comprising first and second relays each having an operating coil, two mercury-wetted contacts and an armature movable between the contacts, the spacing of the contacts being such that the mercury bridges momentarily across the contacts each time the armature is transferred from one contact to the other, a source of alternating potential, means for energizing one of the coils from the source at alternate half cycles, and means for energizing the other coil on the intermediate half cycles to successively actuate the armatures, means connecting corresponding contacts of the relays together, and a load circuit including a source of potential connected in series with the contacts for supplying a pulse of energy from the source to the load each time the contacts of each relay are bridged.

6. A generator, according to claim 5, in which the means for energizing the coils includes impedances connected in series with the coils and rectifier elements connected in opposite senses in shunt with the coils.

7. A pulse generator comprising a plurality of relays each having an operating coil, two contacts, an armature movable between the conatcts, mercury on the armature and contacts for momentarily bridging the contacts through the armature each time one of the armatures is transferred from one contact to the other, means for successively energizing the coils for actuating the armatures at a predetermined cyclic rate, an output circuit including a source of potential and a load connected across the contacts.

8. A generator according to claim 7 in which the means for energizing the coils includes a source of alternating potential and means for shifting the phase of the currents in the relay coils by different amounts to produce a desired time sequence in the operation of the armatures.

9. In a system for momentarily closing an external circuit at a predetermined repetitive rate, first and second relays each having an operating coil, two spaced, mercury-wetted contacts and an armature movable between the contacts, the spacing of the contacts being such that the mercury bridges momentarily across the contacts each time the armature is transferred from one contact to the other, means for successively energizing the coils at regularly timed intervals to actuate the armatures at staggered intervals, and means connecting the contacts in the external circuit for closing said circuit momentarily each time the contacts of the relays are bridged.

No references cited.